(12) United States Patent
Sakata (10) Patent No.: US 8,955,921 B2
(45) Date of Patent: Feb. 17, 2015

(54) HYDRAULIC BRAKE APPARATUS FOR VEHICLE

(75) Inventor: Yasunori Sakata, Toyota (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 575 days.

(21) Appl. No.: 13/242,668

(22) Filed: Sep. 23, 2011

(65) Prior Publication Data

US 2012/0074769 A1 Mar. 29, 2012

(30) Foreign Application Priority Data

Sep. 24, 2010 (JP) .................. 2010-213850

(51) Int. Cl.
*B60T 13/70* (2006.01)
*B60T 13/14* (2006.01)
*B60T 13/66* (2006.01)
*B60T 13/68* (2006.01)

(52) U.S. Cl.
CPC ............. *B60T 13/145* (2013.01); *B60T 13/662* (2013.01); *B60T 13/686* (2013.01)
USPC .......................................................... 303/15

(58) Field of Classification Search
USPC .................. 303/3, 15, 122.03–122.05, 119.1, 303/119.2; 60/533
See application file for complete search history.

(56) References Cited

U.S. PATENT DOCUMENTS

| | | | |
|---|---|---|---|
| 6,412,883 B1 * | 7/2002 | Mizutani et al. | 303/114.3 |
| 6,478,385 B1 * | 11/2002 | Nishii et al. | 303/114.1 |
| 6,557,950 B2 * | 5/2003 | Ishida et al. | 303/20 |
| 6,663,191 B2 * | 12/2003 | Sakata et al. | 303/3 |
| 2002/0096936 A1 * | 7/2002 | Ishida et al. | 303/114.1 |

FOREIGN PATENT DOCUMENTS

| | | |
|---|---|---|
| JP | 08-133039 A | 5/1996 |
| JP | 09-024819 A | 1/1997 |
| JP | 2000-309267 A | 11/2000 |
| JP | 2001-260860 A | 9/2001 |

* cited by examiner

*Primary Examiner* — Vishal Sahni
(74) *Attorney, Agent, or Firm* — Buchanan Ingersoll & Rooney PC (57) ABSTRACT

A hydraulic brake apparatus for a vehicle is provided. The hydraulic brake apparatus includes a master cylinder, a high hydraulic pressure source, a brake assist mechanism, a liquid reservoir, an electronic control device, a hydraulic control device and is configured such that the master cylinder is actuated by a force assisted by the brake assist mechanism to generate a hydraulic pressure and a braking force according to the hydraulic pressure is applied to a wheel of the vehicle. The hydraulic brake apparatus further includes driving pressure reducing valve which is configured such that when a hydraulic pressure in a master pressure input port is higher than that in the driving pressure input port by a predetermined value, the hydraulic brake apparatus is actuated based on the pressure difference to open a hydraulic pressure discharge path extending from a driving hydraulic pressure chamber to the liquid reservoir.

8 Claims, 5 Drawing Sheets

ASSIST PRESSURE = Pa
MC PRESSURE = Pm

HYDRAULIC BRAKE APPARATUS FOR VEHICLE

CROSS REFERENCE TO RELATED APPLICATIONS

This application is based on and claims priority under 35 U.S.C. §119 to Japanese Patent Application 2010-213850, filed on Sep. 24, 2010, the entire content of which is incorporated herein by reference.

BACKGROUND

1. Field of the Invention

The present invention relates to a hydraulic brake apparatus for a vehicle having both a hydraulic booster function which can assist a brake operation of a driver by a hydraulic pressure from a high pressure hydraulic source and a braking force control function by an electronic control.

2. Description of Related Art

In a hydraulic brake apparatus for a vehicle having both the hydraulic booster function and the braking force control function such as Anti-lock Brake System (ABS) or an Electronic Stability Control (ESC) by an electronic control, a hydraulic pressure generated by a power driven pump is feedback to an output path from a master cylinder while the braking force control by the electronic control is performed. Since the output path is closed during operation of braking, a hydraulic pressure generated by the master cylinder (hereinafter referred to as "MC pressure") is increased to be higher than necessary pressure due to liquid amount by pump-back. This situation is not desirable from the viewpoint of the safety, and also, durability of the components in a hydraulic circuit is deteriorated.

In consideration of the above situation, JP H08-133039A describes a technique that an excessive pressure is relieved by providing a relief valve in a discharge path from a pump (see, paragraph 1, line 19).

Furthermore, JP 2001-260860A describes a technique that when a pressure in a main path communicating with a discharge port of the pump is abnormally high, an electronic gate valve provided in the main path is controlled to relieve the excessive pressure.

The relief valve described in JP H08-133039A is configured to protect components or hydraulic paths from abnormal pressure and an actuation pressure thereof is set slightly high so as not to affect a desired brake performance. For this reason, in the brake apparatus equipped with the relief valve, an excessive MC pressure could be generated to deteriorate the durability of hydraulic components in the hydraulic path. In addition, although the variation and increase of the MC pressure is thought to disturb the control using a sensor for detecting the MC pressure, there is no countermeasure to solve such a problem.

In the technique described in JP 2001-260860A, the relief valve is not employed, and thus, the above problem is not occurred. However, this technique requires an electronic gate valve and a drive circuit for the electronic gate valve. The electronic gate valve is required to be subject to a pulse modulation control, so that the electric power is always supplied to the electronic gate valve while the braking force control is performed. Therefore, there is a problem that power consumption is increased and the size of the brake apparatus becomes larger for mechanism of preventing over heat.

SUMMARY

An aspect of the present invention provides a hydraulic brake apparatus for a vehicle which has both a hydraulic booster function and a braking force control function such as ABS or ESC, and which can avoid a situation where a MC pressure becomes excessively high due to a hydraulic pressure supplied from the power driven pump while the braking force control is performed by the electronic control, without deteriorating regular brake performance.

According to an illustrative embodiment of the present invention, there is provided a hydraulic brake apparatus for a vehicle including: a brake assist mechanism which includes a power piston and a driving hydraulic pressure chamber, and which is driven by a hydraulic pressure introduced into the driving hydraulic pressure chamber; a master cylinder which includes a master hydraulic pressure chamber 1a and a master piston, wherein the mater, piston is actuated by a force assisted by the brake assist mechanism to generate a hydraulic pressure in the master hydraulic pressure chamber; an electronic control device which is configured to determine whether a braking force control is necessary and output a control command when necessary; a hydraulic control device which includes a power driven pump, and which is configured to apply braking force to a wheel of the vehicle based on the hydraulic pressure of the master cylinder under a control of the electronic control device; a high hydraulic pressure source which is configured to supply a hydraulic pressure to the driving hydraulic pressure chamber; a liquid reservoir which has an inner pressure lower than the hydraulic pressure of the high hydraulic pressure source; a driving pressure regulating valve mechanism which is configured to respectively switch a communication/interrupting state between the high hydraulic pressure source and the driving hydraulic pressure chamber and a communication/interrupting state between the driving hydraulic pressure chamber and the liquid reservoir according to an operation amount of a brake operating member so as to regulate the hydraulic pressure in the driving hydraulic pressure chamber to a value corresponding to the operation amount of the brake operating member; and a driving pressure reducing valve. The driving pressure reducing valve includes: a valve body; a master pressure input port which is formed in the valve body and is connected with the master hydraulic pressure chamber; a driving pressure input port which is formed in the valve body and is connected with the driving hydraulic pressure chamber; and a valve main body which receives a hydraulic pressure in the master pressure input port and a hydraulic pressure in the driving pressure input port in opposite directions. When the hydraulic pressure in the master pressure input port is higher than the hydraulic pressure in the driving pressure input port by a predetermined value, the valve main body opens a hydraulic pressure discharge path extending from the driving hydraulic pressure chamber to the liquid reservoir such that the pressure in the driving hydraulic pressure chamber is reduced.

In a hydraulic brake apparatus including a master cylinder in which a brake assist mechanism having a power piston is driven by a hydraulic pressure introduced into a driving hydraulic pressure chamber and a master piston is actuated by a force assisted by the brake assist mechanism to generate a hydraulic pressure in a master hydraulic pressure chamber; an electronic control device configured to determine whether a braking force control is necessary so as to output a control command when necessary, and a hydraulic control device which includes a power driven pump and which applies the braking force corresponding to the hydraulic pressure of the master hydraulic pressure chamber to the wheel of the vehicle, it is considered that the hydraulic pressure of the master hydraulic pressure chamber by pump-back is higher than the pressure corresponding to a brake operation amount.

For example, as a driver performs a braking operation (for example, a driver depresses a brake pedal), a spool valve is pressed down and actuated to connect the driving hydraulic pressure chamber to the high hydraulic pressure source. On this account, the driving hydraulic pressure chamber switches to a pressure increasing mode, so that the hydraulic pressure of the high hydraulic pressure source is introduced therein. The power piston of the brake assist mechanism is actuated by the hydraulic pressure to assist the braking operation.

In this case, the piston of the master cylinder is driven by the assisted force to generate a hydraulic pressure corresponding to the brake operating force assisted to the master hydraulic pressure chamber. At this time, a reaction force is generated to cause a rubber reaction disc of the brake assist mechanism to be pressed and deformed, and thus to attribute to a balance point of forces to which the power piston and the spool valve are subjected in opposite directions, so that the communication between the high hydraulic pressure source and the driving hydraulic pressure chamber is interrupted. As a result, the brake assist mechanism switches to a maintaining mode, so that the assist pressure in the driving hydraulic pressure chamber is maintained.

In this situation, it is considered that when a control of the braking force by the electronic control, for example, ABS control is performed, a hydraulic pressure from the power driven pump is introduced into a discharge path of the master cylinder, so that the MC pressure becomes higher than the pressure corresponding to the brake operation due to liquid amount by a pump-back.

However, in the hydraulic brake apparatus having the above-described configuration, when a relationship of the MC pressure>the assist pressure is satisfied, a differential pressure between these pressures is applied on each end of the valve main body of the driving pressure reducing valve and the power piston of the assist mechanism in opposite directions.

In this way, the valve main body is pressed and actuated by the differential pressure (fluid pressure differential) and the driving pressure reducing valve is caused to open the hydraulic pressure discharge path between the driving hydraulic pressure chamber and the liquid reservoir. Therefore, the assist pressure of the driving hydraulic pressure chamber is discharged to the liquid reservoir. Accordingly, the volume of the driving hydraulic pressure chamber, i.e., the liquid measure in the driving hydraulic pressure chamber is reduced and the piston of the master cylinder is urged and returns. Consequently, the volume of the master hydraulic pressure chamber is increased so as to prevent the MC pressure from increasing.

As such, according to the above-described configuration, since the driving pressure reducing valve is mechanically actuated by the differential pressure between the MC pressure and the assist pressure, the increase of the MC pressure due to liquid amount by pump-back can be suppressed without causing the power consumption to increase.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a hydraulic brake apparatus for a vehicle according to an illustrative embodiment of the present invention will be described in detail with reference to the accompanying drawings. The hydraulic brake apparatus for a vehicle (hereinafter referred to as simply "a hydraulic brake apparatus") illustrated in FIG. 1 includes: a master cylinder 1; a high hydraulic pressure source 2; a brake assist mechanism 3; a liquid reservoir 4 (for example, atmospheric reservoir is illustrated in the FIG. 1) which has an inner pressure smaller than a hydraulic pressure of the high hydraulic pressure source 2; a wheel cylinder 5 which is actuated by a hydraulic pressure supplied from the master cylinder 1; an electronic control device 6 which determines whether a braking force control is necessary based on vehicle behavior information provided from various sensors such as a wheel speed sensor (not illustrated), an acceleration sensor (not illustrated) or a yaw sensor (not illustrated); a hydraulic control device 7 which regulates a hydraulic pressure of the wheel cylinder 5 based on commands transmitted from the electronic control device 6; a driving pressure regulating valve mechanism 8 which is incorporated in the brake assist mechanism 3; a driving pressure reducing valve 9; and a discharge path interrupting valve 10.

Figure 1:
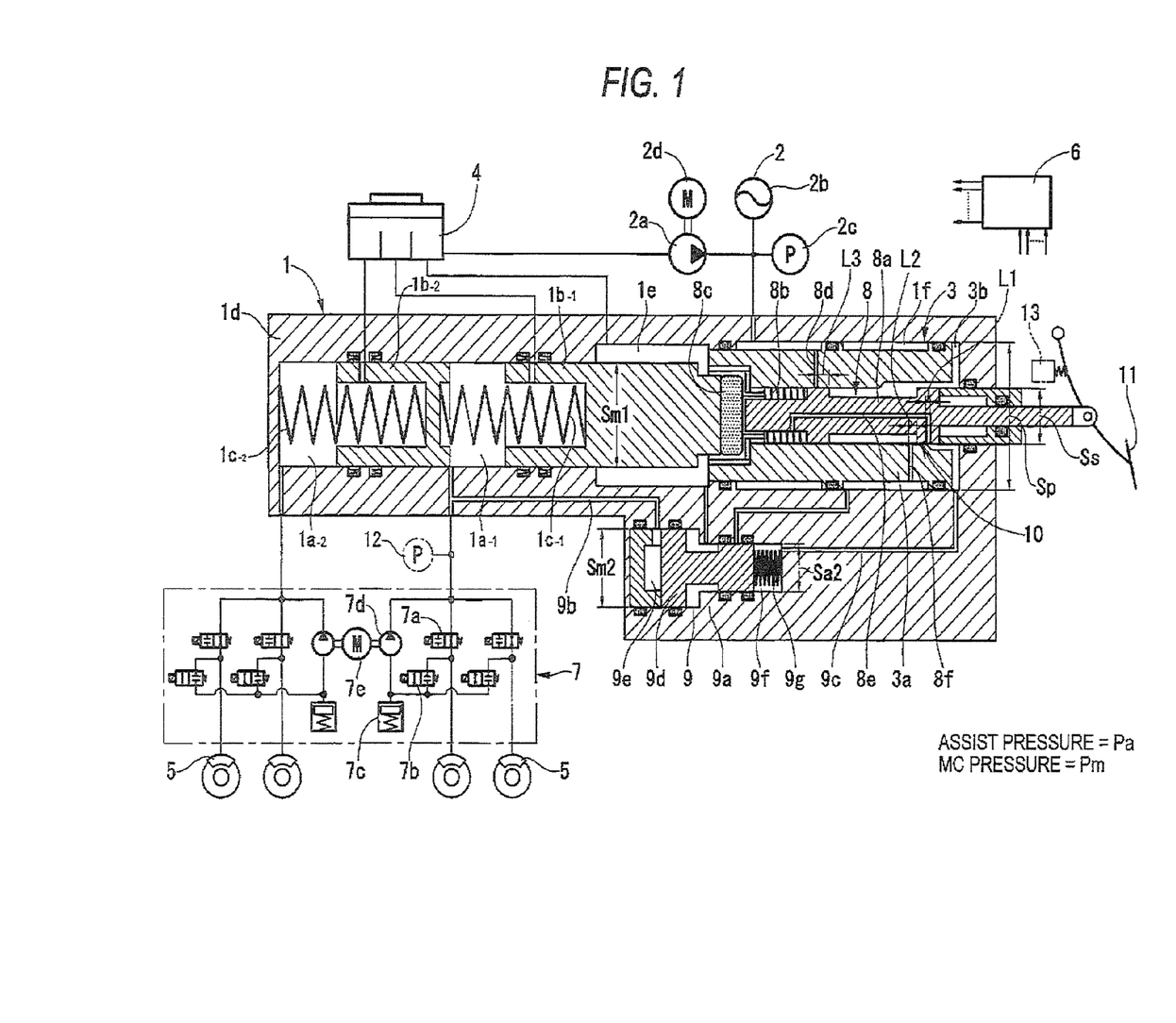
FIG. 1 is a view schematically illustrating a hydraulic brake apparatus for a vehicle according to an illustrative embodiment of the present invention.

The master cylinder 1 is a know tandem cylinder including a cylinder body $1d$. The cylinder body $1d$ includes therein two master hydraulic pressure chambers $1a_{-1}$, $1a_{-2}$ ($_{-1}$, $_{-2}$ are attached for distinction, and this is same in the following), pistons $1b_{-1}$, $1b_{-2}$, which individually press brake fluids in respective master hydraulic pressure chambers, and return springs $1c_{-1}$, $1c_{-2}$ which respectively return the both pistons $1b_{-1}$, $1b_{-2}$.

The high hydraulic pressure source 2 includes a pump $2a$, a pressure reservoir (accumulator) $2b$, a pressure sensor $2c$ which detects a hydraulic pressure of the pressure reservoir $2b$, and a motor $2d$ which drives the pump $2a$. The motor $2d$ is configured to turn-on and turn-off based on the pressure detected by the pressure sensor $2c$.

The illustrated brake assist mechanism 3 includes a driving pressure regulating valve mechanism 8, a power piston $3a$ into which the spool valve $8a$ of the driving pressure regulating valve mechanism 8 is inserted, and a driving hydraulic pressure chamber $3b$ applies a hydraulic pressure on a rear end of the power piston $3a$.

Further, in the present illustrative embodiment, the hydraulic control device 7 includes a pressure maintaining electronic valve $7a$ which can separate the wheel cylinder 5 from the master cylinder 1, a pressure reducing electronic valve 7b which discharges the hydraulic pressure of the wheel cylinder 5, a low pressure fluid reservoir 7c which temporarily accumulates the brake fluid discharged from the wheel cylinder 5, a pump 7d which pumps up the brake fluid in the low pressure fluid reservoir 7c, and a motor 7e which drives the pump 7d.

The hydraulic control device 7 is a known device which regulates the pressure of the wheel cylinder 5 based on commands provided from the electronic control device 6 which is configured to determine whether a pressure reducing operation or a pressure re-increasing operation is necessary. When the commands from the electronic control device 6 is a pressure reducing instruction, the pressure maintaining electronic valve 7a which is a normally open valve is closed and the pressure reducing electronic valve 7b which is a normally close valve is opened such that the wheel cylinder 5 is depressurized. When the commands from the electronic control device 6 is switched to a pressure re-increasing command, the pressure reducing electronic valve 7b is closed and the pressure maintaining electronic valve 7a is opened such that the hydraulic pressure generated by the pump 7d is supplied to the wheel cylinder 5.

The driving pressure regulating valve mechanism 8 includes a spool valve 8a which is slidably inserted into the central portion of the power piston 3a, a return spring 8b which pushes the spool valve 8a to be returned, a rubber reaction disc 8c which is interposed between the spool valve 8a and the piston $1b_{-1}$, an inlet port 8d which is formed in the power piston 3a and opened/closed by the spool valve 8a, a first drain port 8e which is formed within the spool valve 8a and opened/closed by the power piston 3a, and a second drain port 8f which is formed within the power piston 3a and opened/closed by the spool valve 8a.

The first drain port 8e is communicated with the liquid reservoir 4 via spaces which are respectively formed on a tip end periphery of the spool valve 8a and the periphery of the reaction disc 8c and a hydraulic chamber 1e formed inside a cylinder body 1d. The second drain port 8f is communicated with the liquid reservoir 4 via a hydraulic chamber 1f formed on the periphery of the power piston 3a, a discharge path inside the valve body 9a and the hydraulic chamber 1e when the discharge path is opened by the driving pressure reducing valve 9. The valve body 9a is integrally formed with the cylinder body 1d.

In the illustrated hydraulic brake apparatus, the driving pressure regulating valve mechanism 8 is provided at an input side of the master cylinder 1. However, for example, as described in JP H09-24819A or JP 2000-309267A, there may be a master cylinder in which a driving pressure regulating valve mechanism (pressure regulating valve) is disposed on the tip end side (a side opposite to the input side with respect to a hydraulic chamber) of the cylinder body. The inventive concept of the present invention may be applied to the hydraulic brake apparatus in which the driving pressure regulating valve mechanism 8 is provided at a tip end of the cylinder body. The disclosures of JP H09-24819A and JP 2000-309267A are incorporated herein by reference.

The driving pressure reducing valve 9 includes: a master pressure input port 9b which is formed in the valve body 9a integral with the cylinder body 1d and connected to one of the master hydraulic pressure chamber (the master hydraulic pressure chamber $1a_{-1}$ in the drawings); a driving pressure input port 9c which is formed in the valve body 9a and connected to the driving hydraulic pressure chamber 3b; a valve main body 9d which receives a hydraulic pressure of the master pressure input port 9b and a hydraulic pressure of the driving pressure input port 9c in opposite directions; a first hydraulic pressure chamber 9e and a second hydraulic pressure chamber 9f which are partitioned each other by the valve body 9d; and a return spring 9g which returns the displaced valve main body.

As described in the above, in the configuration where the driving pressure reducing valve 9 is integrally formed with the master cylinder 1 by forming the master pressure input port 9b, the driving pressure input port 9c, the first hydraulic pressure chamber 9e and the second hydraulic pressure chamber 9f inside the valve body 9a integral with the cylinder body 1d, an outer piping is not necessary, so that compactness and simplicity of the hydraulic brake apparatus can be securely achieved while effectively utilizing space. However, alternatively, the driving pressure reducing valve 9 may be a component separate from the master cylinder 1.

The first hydraulic pressure chamber 9e is connected with the master pressure input port 9b, and one side of the valve main body 9d faces the first hydraulic pressure chamber 9e. The second hydraulic pressure chamber 9f is connected with the driving pressure input port 9c, and the other side of the valve main body 9d faces the second hydraulic pressure chamber 9f.

Further, the discharge path interrupting valve 10 is configured by the spool valve 8a and the second drain port 8f formed on the power piston 3a. When the driving hydraulic pressure chamber 3b is in a pressure increasing mode, the second drain port 8f is closed by the spool valve 8a, so that the discharge path extending through the hydraulic chamber 1f on the periphery of the power piston 3A and the hydraulic chamber 1e inside the cylinder body 1d is interrupted. Since the illustrated discharge path interrupting valve 10 also uses the spool valve 8a of the driving pressure regulating valve mechanism 8 as a valve main body, a dedicated valve mechanism for closing the drain port is not required and thus it can be avoided that the number of the components is increased or the structure of the components becomes complicated.

Herein, if a stroke of the spool valve 8a from an initial position thereof to the inlet port 8d is referred to as L3, a stroke of the spool valve 8a which continuously closes the second drain port 8f when it is in the pressure increasing mode is referred to as L2, a stroke of the spool valve 8a from the initial position to a position in which the spool valve closes the first drain port 8e is referred to as L1, a relationship of L3>L2>L1 is satisfied.

Further, if a pressure receiving area of the power piston 3a is referred to as Sp, a sectional area of the spool valve 8a is referred to as Ss, a pressure receiving area of the valve main body 9d which receives the assist pressure is referred to as Sa2, a pressure receiving area of the piston $1b_{-1}$ is referred to as Sm1, a pressure receiving area of the valve main body 9d which receives the MC pressure is referred to as Sm2, the assist pressure is referred to as Pa, and the MC pressure is referred to as Pm, a balance formula between the assist pressure and the reaction force is as follows.

$$Pm \times Sm1 = Pa \times Sa2 = Pa \times (Sp - Ss)$$

Balance formula of a force opposed to the valve main body 9d when the spring 9g of the driving pressure reducing valve 9 is constituted by a weak spring (spring force K≈0) is as follows.

$$Pm \times Sm2 = Pa \times Sa2 + K (K \approx 0)$$

Accordingly, following equations are deduced.

$$Sa2 = (Pm/Pa) \times Sm2$$

$$Pm/Pa = (Sp - Ss)/Sm1$$

$$Sa2 = (Sp - Ss)/Sm1 = Sm2$$

From those equations, an area ratio among the piston $1b_{-1}$ and the power piston $3a$ and the spool valve $8a$ is equal to (Sp−Ss)/Sm1, and the ratio (Sp−Ss)/Sm1 is equal to a ratio Sa2/Sm2 between a pressure receiving area of the valve main body $9d$ at a side of the first hydraulic pressure chamber $9e$ and a pressure receiving area of the valve main body $9d$ at a side of the second hydraulic pressure chamber $9f$.

Further, in this illustrative embodiment, the relationship between the pressure receiving areas of the valve main body $9d$ is set as Sm2>Sa2, and thus, it is possible to reduce the introduction effect (variation in the assist pressure) of the brake fluid from the driving pressure reducing valve 9 to the driving hydraulic pressure chamber $3b$ when the valve main body $9d$ of the driving pressure reducing valve 9 moves to a right side in FIG. 1.

As a way of suppressing the increase of the MC pressure due to the pump-back, a method which is adapted to relieve an excessive pressure by providing a relief valve in a discharge path of the master cylinder is considered. However, in this method, there is a problem that the excessive pressure cannot be relieved unless the MC pressure exceeds a predetermined level of the relief valve. In contrast, in the above configuration utilizing the formula, (Sp−Ss)/Sm1=Sa2/Sm2, even if the differential pressure between the MC pressure and the assist pressure is not significantly large, the valve main body $9d$ can be driven to suppress the increase of the MC pressure due to the pump-back with a high responsivity.

More specifically, the diameter of the valve main body $9d$ is set smaller than that of the power piston $3a$ and the contact area of the valve main body $9d$ which contacts the valve body $9a$ is set smaller than that of the power piston $3a$ which contacts the valve body $9a$. Also, the sliding resistance of the valve main body $9d$ relative to the valve body $9a$ is set smaller than the sliding resistance of the power piston $3a$ relative to the valve body $9a$.

Figure 2:
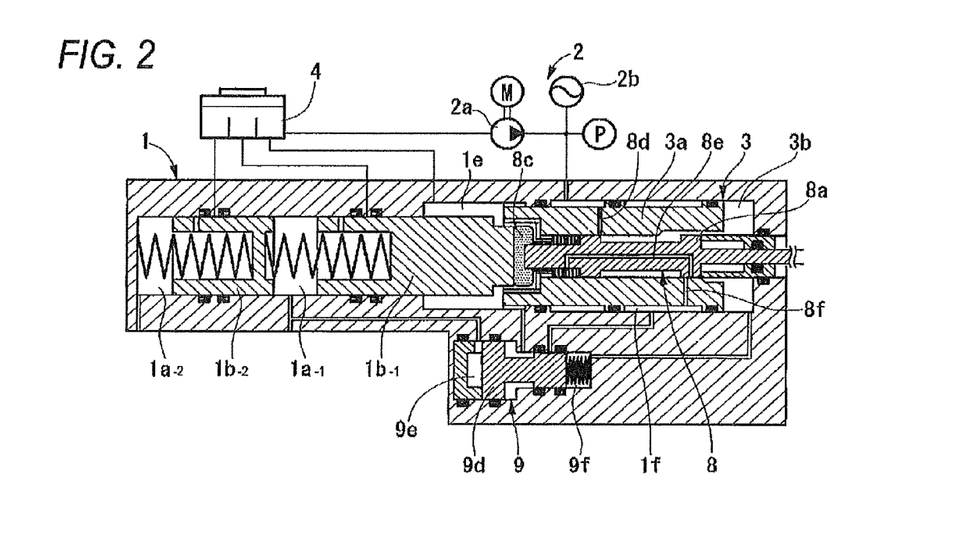
FIG. 2 is a view illustrating a state where the hydraulic brake apparatus is in a pressure increasing mode.

In the hydraulic brake apparatus having above configurations, when the brake operating member 11 is operated (the pedal is depressed down in the drawing) in a initial state illustrated in FIG. 1, the spool valve $8a$ is pushed and the first drain port $8e$ formed on the spool valve $8a$ is first closed by the power piston $3a$, so that the driving hydraulic pressure chamber $3b$ is separated from the liquid reservoir 4. And then, the inlet port $8d$ formed on the power piston $3a$ opens as illustrated in FIG. 2, so that the driving hydraulic pressure chamber $3b$ is communicated with the high hydraulic pressure source 2. By doing so, the driving hydraulic pressure chamber $3b$ becomes a pressure increasing mode, the hydraulic pressure of the high hydraulic pressure source 2 is introduced into the driving hydraulic pressure chamber $3b$ and the power piston $3a$ on which the hydraulic pressure is applied pushes the piston $1b_{-1}$, so that the operating force is generated.

When the piston $1b_{-1}$ is pressed by the assisted power as illustrated in FIG. 2, a hydraulic pressure is generated in the master hydraulic pressure chamber $1a_{-1}$ and the generated hydraulic pressure urges the piston $1b_{-2}$ to generate a hydraulic pressure in the another master hydraulic pressure chamber $1a_{-2}$. In this case, the hydraulic pressure generated in the master hydraulic pressure chamber $1a_{-1}$ is equal to the hydraulic pressure generated in the other master hydraulic pressure chamber $1a_{-2}$. As a result, the hydraulic pressure is supplied to the wheel cylinder 5 to apply a braking force corresponding to the hydraulic pressure of the master hydraulic pressure chamber to the wheels of the vehicle.

Under this situation, the reaction disc $8c$ is compressed by a reaction force transmitted via the piston $1b_{-1}$, thereby to attribute to a balance point of forces to which the spool valve $8a$ and the power piston $3a$ are subjected in opposite directions. Accordingly, the communication between the high hydraulic pressure source 2 and the driving hydraulic pressure chamber $3b$ is interrupted and the brake assist mechanism 3 switches to a maintaining mode illustrated in FIG. 3, so that the assist pressure in the driving hydraulic pressure chamber $3b$ is maintained.

Figure 5:
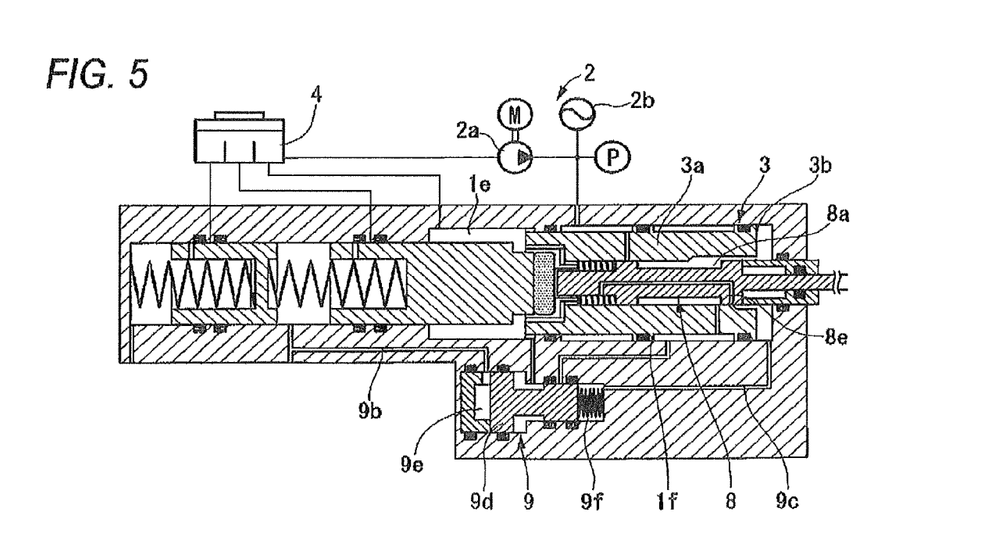
FIG. 5 is a view illustrating a state where the hydraulic brake apparatus is in a pressure reducing mode.

Further, when the brake operating member 11 returns, as illustrated in FIG. 5, the first drain port $8e$ formed on the spool valve $8a$ opens and the driving hydraulic pressure chamber $3b$ is communicated with the liquid reservoir 4 via the hydraulic chamber $1e$ to discharge the assist pressure within the driving hydraulic pressure chamber $3b$.

Figure 6:
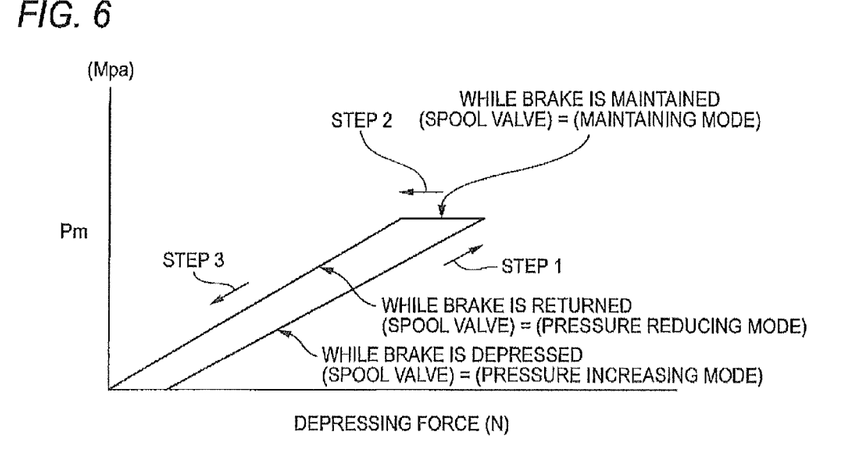
FIG. 6 is a view illustrating a relationship between a brake operating force (depressing force N) and a MC pressure during a regular brake operation.

Subsequently, since the forces which are applied on the valve main body $9d$ in opposite directions are balanced based on the formula, {Pm×Sm2=Pa×Sa2+K(K≈0)} during a regular brake operation, the driving pressure reducing valve 9 is not actuated and the valve main body $9d$ is maintained at the initial position. At this time, the relationship between the brake operation force (depressing force N) and the MC pressure Pm is illustrated in FIG. 6. The step 1 in FIG. 6 indicates a pressure increasing mode in which an operation of the brake operating member is performed (for example, a driver depresses a brake pedal) and the step 2 indicates a maintaining mode, and step 3 indicates a pressure reducing mode in which an operation of the brake operating member is released (for example, the brake pedal returns).

Figure 3:
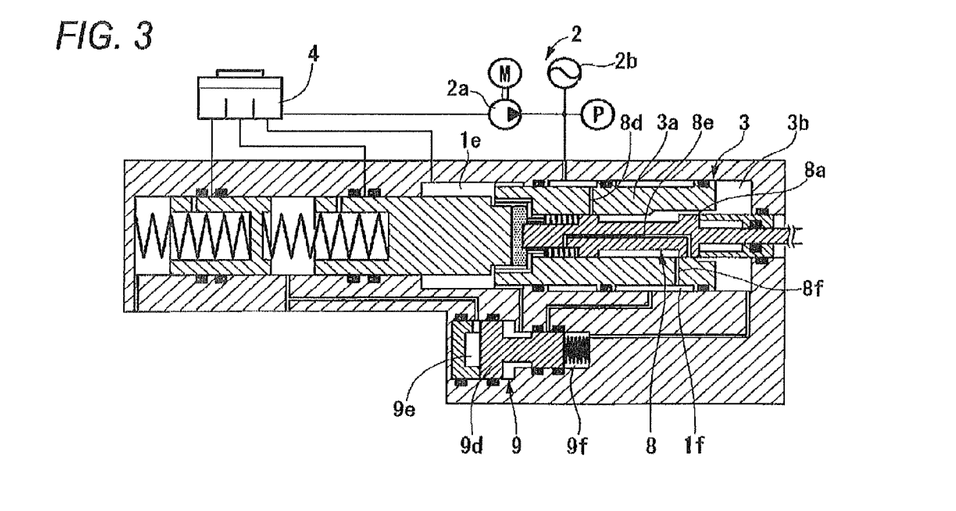
FIG. 3 is a view illustrating a state where the hydraulic brake apparatus is in a maintaining mode without a pump-back.

In the illustrated brake apparatus, when the braking force control, for example, ABS control is performed, the brake assist mechanism 3 becomes a maintaining mode, so that the driving hydraulic pressure chamber $3b$ is hermetically-closed. At this time, if there is no pump-back (there is no feedback from the pump $7d$), as illustrated in FIG. 3, the second drain port $8f$ formed on the power piston $3a$ is communicated with the driving hydraulic pressure chamber $3b$. However, since the driving pressure reducing valve 9 is not actuated, the path formed between the hydraulic chambers $1f$, $1e$ is closed and held so that the second drain port $8f$ is not communicated with the liquid reservoir 4. As a result, the interrupting state between the driving hydraulic pressure chamber $3b$ and the liquid reservoir 4 is maintained.

Meanwhile, in a situation where the braking force control is performed and the driving hydraulic pressure chamber $3b$ of the brake assist mechanism 3 is hermetically-closed in the maintaining mode, when the pump-back (feedback from the pump $7d$) is occurred, the MC pressure becomes higher than the assist pressure due to liquid amount by a pump-back. And, such a differential pressure is applied and thus returns the valve main body $9d$ and the power piston $3a$.

Figure 4:
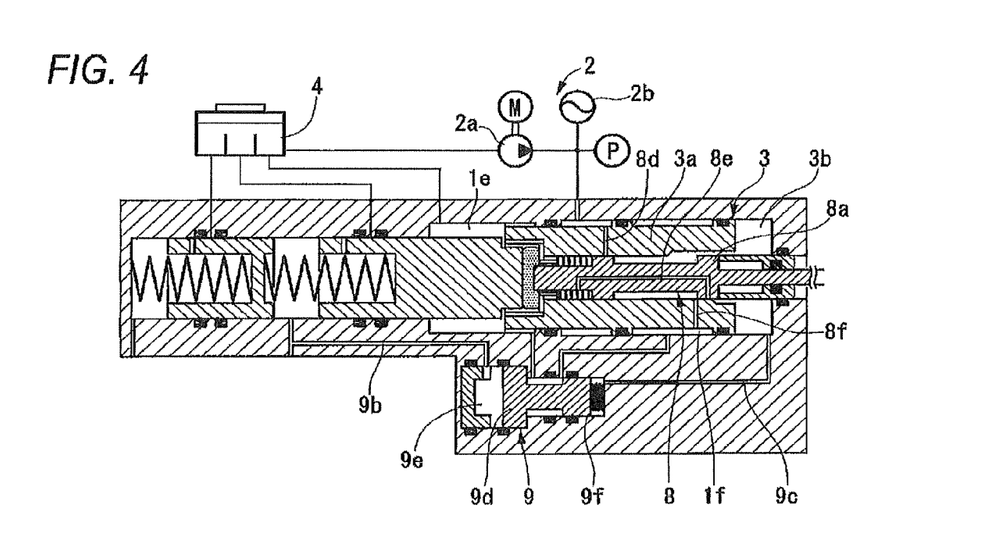
FIG. 4 is a view illustrating a state where the hydraulic brake apparatus is in a maintaining mode with a pump-back.

The MC pressure is introduced into the first hydraulic pressure chamber $9e$ through the master pressure input port $9b$ and the assist pressure is introduced into the second hydraulic pressure chamber $9f$ through the driving pressure input port $9c$. At this time, since the valve main body $9d$ is configured to move easily compared to the power piston $3a$ owing to a difference of the pressure hysteresis, the valve main body $9d$ moves in advance before the power piston (i.e., the driving pressure regulating valve mechanism 8 is actuated). Therefore, the path formed between the hydraulic chambers $1f$, $1e$ opens as illustrated in FIG. 4, and thus the driving hydraulic pressure chamber $3b$ is communicated with the liquid reservoir 4 via the hydraulic chamber $1f$, a hydraulic chamber on the periphery of the valve main body $9d$ and the hydraulic chamber $1e$ inside the cylinder body, so that the brake fluid in the driving hydraulic pressure chamber $3b$ is discharged.

Further, such a discharge operation causes the power piston $3a$ to be retracted and the volume of the driving hydraulic pressure chamber 3b is reduced. Accordingly, the pistons $1b_{-1}$, $1b_{-2}$ of the master cylinder are retracted and the volume of the master hydraulic pressure chambers $1a_{-1}$, $1a_{-2}$ is expanded. As a result, it is suppressed that the MC pressure increases to an excessively high pressure.

Figure 7:
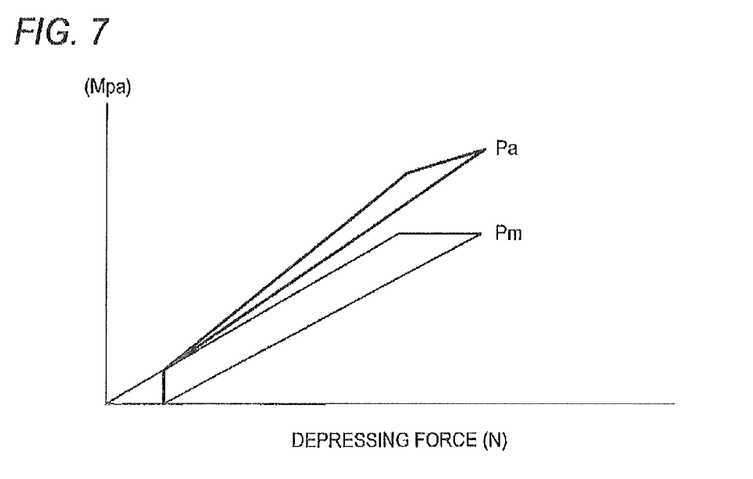
FIG. 7 is a view illustrating a relationship between the brake operating force (depressing force N) and the MC pressure and a relationship between the brake operating force and an assist pressure when the driving pressure reducing valve is actuated.
Figure 8:
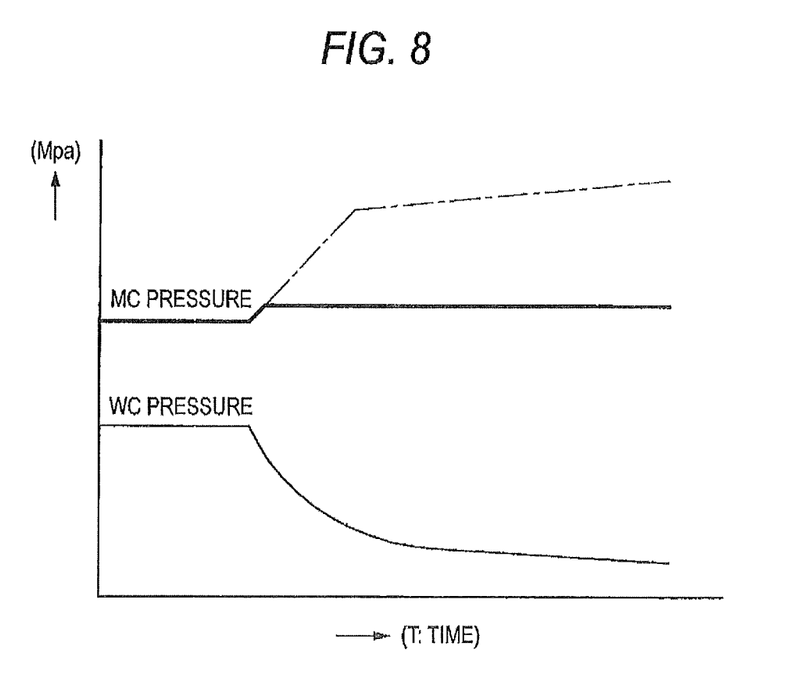
FIG. 8 is a view illustrating variations in the wheel cylinder pressure and the MC pressure with time when the driving pressure reducing valve is actuated.

At this time, a relationship between the brake operating force (depressing force N) and the MC pressure Pm and a relationship between the brake operating force and an assist pressure Pa are illustrated in FIG. 7. In addition, FIG. 8 illustrates variations in the wheel cylinder pressure and the MC pressure after ABS is actuated. When the ABS is performed, a WC pressure is first lowered and then increases by the pressure reducing and re-increasing operations. And, a WC pressure is stably maintained in a state that the control is stable. At this time, the MC pressure increases due to liquid amount by the pump-back, and the increasing range thereof is suppressed by the actuation of the driving pressure reducing valve 9.

In the meantime, in a case that the brake fluid in the driving hydraulic pressure chamber 3b is excessively discharged, since the spool valve 8a moves to a pressure increasing mode in order to maintain the regular relationship between the brake operating force (depressing force) and the assist pressure, the hydraulic pressure discharge path is interrupted as illustrated in FIG. 2.

Furthermore, the relationship "the MC pressure>the assist pressure" is satisfied, even if the sudden braking operation is performed or a braking operation by a force which exceeds the assist force is performed. At this time, when the assist pressure in the driving hydraulic pressure chamber 3b is lowered, a braking force corresponding to the brake operation amount cannot be achieved.

In this regard, the discharge path interrupting valve 10 can effectively act to solve the above problem. When the discharge path interrupting valve 10 is in a pressure increasing mode, the second drain port 8f is closed by the spool valve 8a, so that the discharge path which extends from the driving hydraulic pressure chamber 3b to the liquid reservoir 4 through the hydraulic chambers 1f, 1e is interrupted. On this account, in the pressure increasing mode, the assist pressure is not reduced and thus a braking force corresponding to the brake operation amount can be achieved.

That is, as described above, in the hydraulic brake apparatus according to the illustrative embodiment of the present invention, when the MC pressure is higher than the assist pressure by a predetermined value, the driving pressure reducing valve is actuated by the differential pressure between the MC pressure and the assist pressure to reduce the volume of the driving hydraulic chamber. Accordingly, a situation where the MC pressure is increased to an excessively high pressure by the braking force control function can be suppressed without a relief valve or a special electronic gate valve. Accordingly, it is possible to solve the problems (i.e., a durability of the hydraulic device is deteriorated, or a reliability of the control based on the detected value of the MC pressure decreases, or the volume of the valve increases) generated in the apparatus which uses the relief valve or the special electronic gate valve.

Meanwhile, in the hydraulic brake apparatus including the driving pressure reducing valve 9 which is mechanically actuated according to a detected differential pressure, it is preferred to prepare an approach for both on-fixation state in which the valve main body 9a is fixed to an inactive position and off-fixation state in which the valve main body is fixed to an active position for improving the safety of the vehicle.

In particular, the on-fixation state in which the hydraulic pressure discharge path is opened by the valve main body 9d and the assist by the brake assist mechanism 3 is not performed can be noticed by a driver without the abnormal determining unit. Also, since a pressure sensor 2c included in the high hydraulic pressure source 2 can detect an unexpected pressure drop, the abnormal state can be detected.

In contrast, even if the assist pressure is monitored, it is not possible to detect the off-fixation state. Accordingly, it is proposed that an abnormal determining unit (not illustrated) is provided to detect an abnormal state.

As illustrated in FIG. 1, the detection of the off-fixation can be performed by further providing a pressure sensor 12 which detects the MC pressure, and determining that the driving pressure reducing valve 9 is abnormal when a sign indicating that the MC pressure detected by the pressure sensor 12 increase at a speed higher than a predetermined pressure increasing speed is detected by the electronic control device 6 by a predetermined number of times under a situation where the braking force control is performed by the hydraulic control device 7, and indicating the abnormal state by a buzzer or a lamp.

Further, the detection of the off-fixation can be performed by further providing a stroke sensor 13 which detects the operation amount of the brake operating member 11, determining that the driving pressure reducing valve 9 is abnormal when the MC pressure detected by the pressure sensor 12 is higher than a pressure corresponding to the brake operation amount detected by the stroke sensor 13 in a predetermined value or more under a situation where the braking force control is performed by the hydraulic control device 7, and indicating the abnormal state.

What is claimed is:

1. A hydraulic brake apparatus for a vehicle comprising:
a brake assist mechanism which includes a power piston and a driving hydraulic pressure chamber, and which is driven by a hydraulic pressure introduced into the driving hydraulic pressure chamber;
a master cylinder which includes a master hydraulic pressure chamber and a master piston, wherein the mater piston is actuated by a force assisted by the brake assist mechanism to generate a hydraulic pressure in the master hydraulic pressure chamber;
an electronic control device which is configured to determine whether a braking force control is necessary and output a control command when necessary;
a hydraulic control device which includes a power driven pump, and which is configured to apply braking force to a wheel of the vehicle based on the hydraulic pressure of the master cylinder under a control of the electronic control device;
a hydraulic pressure source which is configured to supply a hydraulic pressure to the driving hydraulic pressure chamber;
a liquid reservoir which has an inner pressure lower than the hydraulic pressure of the hydraulic pressure source;
a driving pressure regulating valve mechanism which is configured to respectively switch a communication/interrupting state between the hydraulic pressure source and the driving hydraulic pressure chamber and a communication/interrupting state between the driving hydraulic pressure chamber and the liquid reservoir according to an operation amount of a brake operating member so as to regulate the hydraulic pressure in the driving hydraulic pressure chamber to a value corresponding to the operation amount of the brake operating member; and a driving pressure reducing valve which includes:
a valve body;
a master pressure input port which is formed in the valve body and is connected with the master hydraulic pressure chamber;
a driving pressure input port which is formed in the valve body and is connected with the driving hydraulic pressure chamber; and
a valve main body which receives a hydraulic pressure in the master pressure input port and a hydraulic pressure in the driving pressure input port in opposite directions;
wherein the valve main body open and closes a hydraulic pressure discharge path extending from the driving hydraulic pressure chamber to the liquid reservoir, wherein the valve main body opens and closes the hydraulic pressure discharge path at a position between the driving hydraulic pressure chamber and the liquid reservoir; and
wherein when the hydraulic pressure in the master pressure input port is higher than the hydraulic pressure in the driving pressure input port by a predetermined value, the valve main body opens the hydraulic pressure discharge path at the position between the driving hydraulic pressure chamber and the liquid reservoir such that the pressure in the driving hydraulic pressure chamber is reduced.

2. The hydraulic brake apparatus according to claim 1,
wherein the driving pressure regulating valve mechanism includes a discharge path interrupting valve which is configured to interrupt the hydraulic pressure discharge path even when the hydraulic pressure in the master pressure input port is higher than the hydraulic pressure in the driving pressure input port by the predetermined value in a pressure increasing mode where the hydraulic pressure source is communicated with the driving hydraulic pressure chamber and the communication between the driving hydraulic pressure chamber and the liquid reservoir is interrupted such that the hydraulic pressure in the driving hydraulic pressure chamber increases.

3. The hydraulic brake apparatus according to claim 1,
wherein the driving pressure reducing valve includes a first hydraulic pressure chamber and a second hydraulic pressure chamber partitioned each other by the valve main body,
wherein the first hydraulic pressure chamber is connected to the master pressure input port, and the second hydraulic pressure chamber is connected to the driving pressure input port,
brake fluid in the master hydraulic pressure chamber is introduced into the first hydraulic pressure chamber when the hydraulic pressure in the master pressure input port is higher than the hydraulic pressure in the driving pressure input port by a predetermined value;
wherein a ratio of a pressure receiving area of the valve main body at a side of the first hydraulic pressure chamber to a pressure receiving area of the valve main body at a side of the second hydraulic pressure chamber is equal to a ratio of a pressure receiving area of the master piston at a side of the master hydraulic pressure chamber to a pressure receiving area of the power piston at a side of the driving hydraulic pressure chamber.

4. The hydraulic brake apparatus according to claim 3,
wherein the pressure receiving area of the valve main body at the side of the second hydraulic pressure chamber is set smaller than the pressure receiving area of the power piston at the side of the driving hydraulic pressure chamber.

5. The hydraulic brake apparatus according to claim 2,
wherein the driving pressure regulating valve mechanism includes a spool valve which is moved to a position corresponding to the operation amount of the brake operating member to respectively switch the communication/interrupting state between the hydraulic pressure source and the driving hydraulic pressure chamber and the communication/interrupting state between the driving hydraulic pressure chamber and the liquid reservoir, and
wherein the discharge path interrupting valve is configured by the spool valve and a first drain port which is formed in the power piston and which is closed by the spool valve in the pressure increasing mode.

6. The hydraulic brake apparatus according to claim 1, further comprising:
a pressure sensor configured to detect the hydraulic pressure in the master cylinder;
an abnormal determining unit configured to determine that the driving pressure reducing valve is abnormal when a sign indicating that the master cylinder pressure increases at a rate higher than a predetermined pressure increasing speed is detected a predetermined number of times under a situation where the braking force control is performed by the hydraulic control device.

7. The hydraulic brake apparatus according to claim 6, further comprising:
a stroke sensor configured to detect an operation amount of the brake operating member,
wherein the abnormal determining unit is configured to determine that there is the sign indicating that the hydraulic pressure in the master cylinder at the rate higher than the predetermined pressure increasing speed when the hydraulic pressure in the master cylinder is higher than a pressure corresponding to the operation amount of the brake operating member by a predetermined value or more under a situation where the braking force control is performed by the hydraulic control device.

8. The hydraulic brake apparatus according to claim 1,
wherein the valve body is integrally formed with a cylinder body of the master cylinder, and
wherein the driving pressure reducing valve is formed therein with the master pressure input port, the driving pressure input port, and the first hydraulic pressure chamber and the second hydraulic pressure chamber which are partitioned by the valve main body, and thus, the driving pressure reducing valve is integrated with the master cylinder.

* * * * *